United States Patent [19]

Araujo et al.

[11] Patent Number: 5,192,402
[45] Date of Patent: Mar. 9, 1993

[54] METHOD OF DEALKALIZING GLASS

[75] Inventors: Roger J. Araujo; Walter F. Love, both of Horseheads, N.Y.

[73] Assignee: Corning Incorporated, Corning, N.Y.

[21] Appl. No.: 834,840

[22] Filed: Feb. 13, 1992

[51] Int. Cl.$^5$ .............................................. C25F 5/00
[52] U.S. Cl. ................................................ 204/130
[58] Field of Search ....................................... 204/130

[56] References Cited

U.S. PATENT DOCUMENTS 3,811,855  5/1974  Carlson ........................... 204/130

*Primary Examiner*—T. M. Tufariello
*Attorney, Agent, or Firm*—Milton M. Peterson; Clinton S. Janes, Jr.

[57] ABSTRACT

A method of dealkalizing a glass body that contains at least one alkali metal ion as either an impurity or an intentionally added constituent. The method involves intimately contacting the glass body with a hydrogen-ion-producing anode and an oxide receptor for the alkali metal ion as a cathode and exposing the glass body and electrode assembly to hydrogen while the assembly is at an elevated temperature.

22 Claims, 3 Drawing Sheets

METHOD OF DEALKALIZING GLASS

FIELD OF THE INVENTION

The field is treatment of a glass body, such as a fused silica or silicate glass body, to remove alkali metal ions by electrolysis.

BACKGROUND OF THE INVENTION

It is well known that alkali metal oxides tend to exert a fluxing action, and thereby facilitate melting, when included in a glass batch. Consequently, most commercial glasses have at least one alkali metal oxide included in their compositions to some extent. For example, the soda-lime silicate sheet glass, commonly used for structural and automotive glazing, usually contains about 18% soda ($Na_2O$).

The term "alkali metal" customarily refers to the metals in Group 1a of the Periodic Table. The present invention is generally effective with all such metals, but primary interest centers on sodium. Hence, the invention is largely described with reference to sodium ions, but is not so limited.

Even in glasses where soda is not intentionally included in the glass composition, it is normally found as an impurity. This is because of its wide-spread occurrence in glass batch materials. Alkali metal oxides, and soda in particular, are generally desirable as glass components. However, every effort must be made to minimize their presence in some glasses. Thus, an alkali metal ion content of as little as several parts per million may have deleterious effects. For example, silica can be sputtered on the surface of silicon chips to form a protective film. Very low concentrations of an alkali metal ion in the silica glass film can adversely affect the electrical properties of the chip in such an application.

The presence of alkali metal oxides, such as soda ($Na_2O$), tends to soften a glass, that is, to reduce its high temperature viscosity. It may also interfere with light transmission in fiber optic applications. In addition, as noted above, the mobility of alkali metal ions may seriously affect electrical properties.

It is known that treatment of a glass with a mineral acid, such as sulfuric acid or the gaseous component thereof, at least partially removes alkali metal oxides from a surface layer on the glass. Such treatment may be employed to improve glass weathering, reduce surface conductivity, and/or alter such properties as strength, refractive index and chemical durability.

United Kingdom Patent No. 948,309 proposes a chemical method of dealkalizing a silicate glass. The glass is treated at an elevated temperature with concentrated sulfuric acid ($H_2SO_4$), or a liquid acid sulfate (e.g., $Na_2HSO_4$), containing no more than 10% water. The reaction is described as an exchange of hydrogen for alkali metal. The hydrogen is capable of subsequent removal as water by heat treatment. The patent notes that electrolysis is not involved.

Techniques for altering a glass surface by ion exchange are also well known. This may be an exchange between alkali metals, or an exchange of an alkali metal for another metal, such as silver or copper. An early United States Patent, showing such an exchange promoted by an electric current, is U.S. Pat. No. 2,198,733 (Leibig et al.). Such an exchange may, of course, be beneficial, but it is an exchange of metals. It is not a removal of one metal without substitution of another metal.

PURPOSES OF THE INVENTION

Attempts have been made to remove alkali metal ions by direct application of an electrical field. However, alkali metal ions cannot be removed from a silicate glass in this manner. This is because of the immobile negative charges resident on certain oxygen atoms, especially the non-bridging oxygen atoms. Any motion of the alkali metal sets up a restoring force by virtue of the separation between the centroid of the positive charge and that of the negative charge. Therefore, alkali metal ions may be removed from the glass only if they are replaced by other positive ions.

One purpose of this invention, then, is to provide a successful electrolytic method for replacing alkali metal ions from a glass by hydrogen ions.

Another purpose is to provide a method of cleansing alkali metal impurities, such as sodium, from a glass product, in particular from a fused silica product.

A further purpose is to provide an efficient method of producing a glass having novel properties by removing an alkali metal from a glass containing such alkali metal in its composition.

SUMMARY OF THE INVENTION

Our invention resides in a method of removing alkali metal ions from a glass body that contains at least one such ion, the method comprising the steps of bringing a hydrogen-ion-producing anode into intimate contact with a portion of the glass body surface, bringing an oxide receptor of the alkali metal ion to be removed into intimate contact with another portion of the glass body surface as a cathode, and exposing the assembly of glass body and electrodes to a hydrogen-containing atmosphere while the assembly is at an elevated temperature and has a direct current applied across the electrodes.

In one embodiment, the glass body is a fused silica body containing sodium ions as an impurity; in another, the glass body has at least one alkali metal oxide in its composition that is to be removed. The hydrogen-ion-producing anode may be palladium or titanium, preferably the former. The oxide receptor serving as a cathode may be an oxide of nickel, iron, vanadium, titanium, molybdenum, niobium, zirconium, tungsten, tantalum, or hafnium, but preferably is tungsten or molybdenum. The electrodes may be solid, flat bodies, or may be evaporated films. The elevated temperature may be in the range of 400°–1200° C., the temperature depending on the glass involved and the depth of alkali removal required.

PRIOR ART

In addition to the patents already noted, the following United States Patents may be of interest:

U.S. Pat. No. 1,592,429 (Kraus)—An invisible mark is produced on glass by electrically driving a foreign ion, such as silver, into a limited area on the glass;

U.S. Pat. No. 1,914,534 (Selenyi)—An alkali metal is driven onto the inner wall of a bulb by a direct current. Then the current is reversed to drive in oxygen to form an oxide;

U.S. Pat. No. 2,055,181 (Rostas)—Forms a light sensitive material, such as potassium, on the wall of a photoelectric tube by applying a direct current;

U.S. Pat. No. 3,647,406 (Fisher)—Treats a glass rod at 400° C. with an $SO_2$-air atmosphere containing water vapor to effect an exchange of hydrogen ion for sodium ion in a surface layer, wherein electrical neutrality is maintained and the refractive index reduced in the surface layer;

U.S. Pat. No. 4,285,988 (Ernsberger)—Creates an aperture pattern on glass with a photoresist, and applies an electric potential to cause inward alkali metal migration in the exposed areas. When the resist is removed and stain applied over the entire surface, staining does not occur in the treated areas, thus indicating alkali metal depletion.

DESCRIPTION OF THE INVENTION

Our invention provides a solution to the problem of removing an unwanted alkali metal from a glass. The alkali metal may be present as an impurity, as in the case of fused silica. Alternatively, it may be present as an intentional ingredient in a glass composition. In that case, removal of the alkali metal produces a glass having distinctly different properties.

The present invention arose from a desire to remove sodium ions that were present as an impurity in fused silica glass. Therefore, the invention is primarily described with respect to the solution of that problem. However, it will be appreciated that the method and assembly described are equally applicable to removal of larger amounts of alkali metal ion. Further, they may be employed in removal of any alkali metal ion, such as potassium, lithium, or cesium.

Commercial fused silica, formed as a boule, or other shape, may contain minute impurity levels of sodium. For example, one material contains on the order of 130 parts per billion (ppb) sodium. While this impurity level is of no consequence for many applications, it was found to be intolerable when the fused silica glass was applied as a protective film on silicon chips used in electronic devices. Even such a low level of sodium in the glass adversely affected the electrical properties of the chip.

Figure 1:
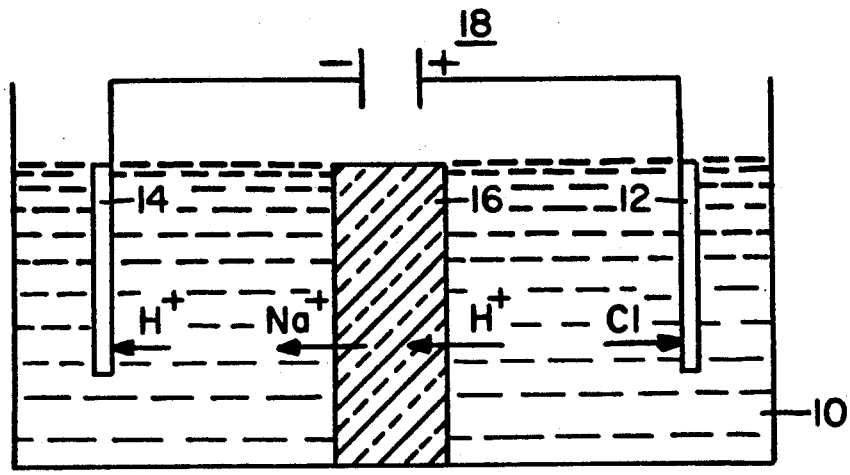
FIG. 1 is a schematic drawing illustrating an electrolysis arrangement in which alkali metal ions are replaced by hydrogen ions.

In principle, any mobile cation, including alkali metal ions, can be replaced by hydrogen ions by means of an electrolysis reaction in an aqueous acid medium. Such an arrangement is shown schematically in FIG. 1 of the drawing. FIG. 1 shows a hydrochloric acid (HCl) bath 10 in which an anode 12 and cathode 14 are suspended. Glass article 16 is positioned between electrodes 12 and 14 and contains sodium ions (Na+).

Upon the application of a field, supplied by electrical source 18, Na+ ions are extracted from the glass into the cathode compartment, as indicated by an arrow. In turn, as also indicated by an arrow, hydrogen ions (H+) enter the glass from the anode compartment. Hydrogen gas is evolved at cathode 14, and chlorine gas is evolved at anode 12. In practice, this procedure would be very slow because of the low mobility of sodium ions in glass at room temperature.

It has been proposed to employ hot mineral acids in effecting an exchange of hydrogen ions for sodium ions. There is a strong tendency for chemical attack on the glass, particularly on silica glasses, and the process still is relatively slow. Furthermore, due to volatilization, it is very hazardous to work with hot acids. That led to development of the substantially different electrolysis procedure which constitutes the present invention.

The essence of the present invention resides in obtaining hydrogen ions directly from hydrogen gas, rather than from a condensed phase source. The invention is further based on the fact that hydrogen gas is soluble in certain metals, particularly palladium and titanium. Further, when dissolved in those metals, hydrogen gas converts to hydrogen ions and delocalized electrons, that is electrons separated from hydrogen analogous to the conductive electrons in metals.

Any metal exhibiting a Fermi level among electronic states having some "d" character may be somewhat effective as the anode. Optimum action is obtained utilizing titanium or palladium, the latter being preferred.

When hydrogen gas is supplied to such a metal anode, and dissolves therein, the hydrogen converts to the ionic form (H+) and can be injected into the glass. The essential requirements are that the metal anode be in close contact with the glass, and that a mechanism exists to withdraw sodium ions from the glass.

Close contact may be secured by evaporating the metal onto the glass surface. Alternatively, it may be provided by bringing together polished flat surfaces under sufficient pressure to maintain the necessary close contact. The second requirement forms the basis of a further feature of the present invention.

In principle, any metal electrode brought into intimate contact with another portion of the glass surface would suffice to extract sodium ions. However, as the sodium ions would emerge from the glass, they would be reduced at the cathode to form metallic sodium. In practice, the sodium metal will tend to penetrate the glass and damage the glass surface. Also, as is well known, free sodium is a hazardous material.

A further feature of the present invention then is the use of an electrode in which alkali metal ions will dissolve without substantial change in dimensions of the electrode. Oxides of certain cations, particularly multivalent cations, contain interstitial sites in their atomic structures that are large enough to accommodate alkali metal ions.

Metal oxides that have at least some degree of utility as cathode materials include oxides of polyvalent metals, such as tungsten, molybdenum, zirconium, niobium, tantalum, hafnium, titanium, vanadium, nickel, iron and cobalt. The first six have general applicability with tungsten oxide being preferred. Hafnia and tantala are technically desirable, but expensive. The last five have limited value in extraction of any alkali metal other than lithium.

Electrical neutrality is preserved through a reduction in the positive valence of the polyvalent metal by the electrons produced at the anode. This compensates for the addition of the positively charged alkali ion. This is essential in carrying out the invention. If charge neutrality were not maintained, a separation of charge would occur in which electrons from the anode would be separated from cations dissolved in the cathode. This would create a back voltage, and the electrolysis would come to a halt.

In summary, there are three essential characteristics, or requirements, of the present invention. These are:

1. A metal anode that possesses a sufficiently high density of electrons at the Fermi level to cause dissolved hydrogen to dissociate into hydrogen ions and delocalized electrons.

2. A metal oxide cathode containing interatomic interstices large enough to accommodate the cation being extracted from the glass.

3. The cathode metal has an unfilled band into which electrons can be easily injected.

The present invention may be employed to extract alkali metal ions from glass articles of various shapes. If the article has flat surfaces, such as a glass sheet, adequate contact between the glass and the electrodes may be provided by the inherent weight of the electrodes. In this case, the electrodes and the glass will be assembled in a vertical sandwich form. If the electrode weights are not sufficient, they may be supplemented by additional metallic electrodes in the manner illustrated in FIG. 2.

In the event the glass article does not have flat surfaces, or if removal in selective areas is required, the electrodes may be applied as films, for example, by thermal evaporation. The glass article, thus provided with electrodes, may then be electrically connected in an electrolysis system such as illustrated in FIG. 2.

Figure 2:
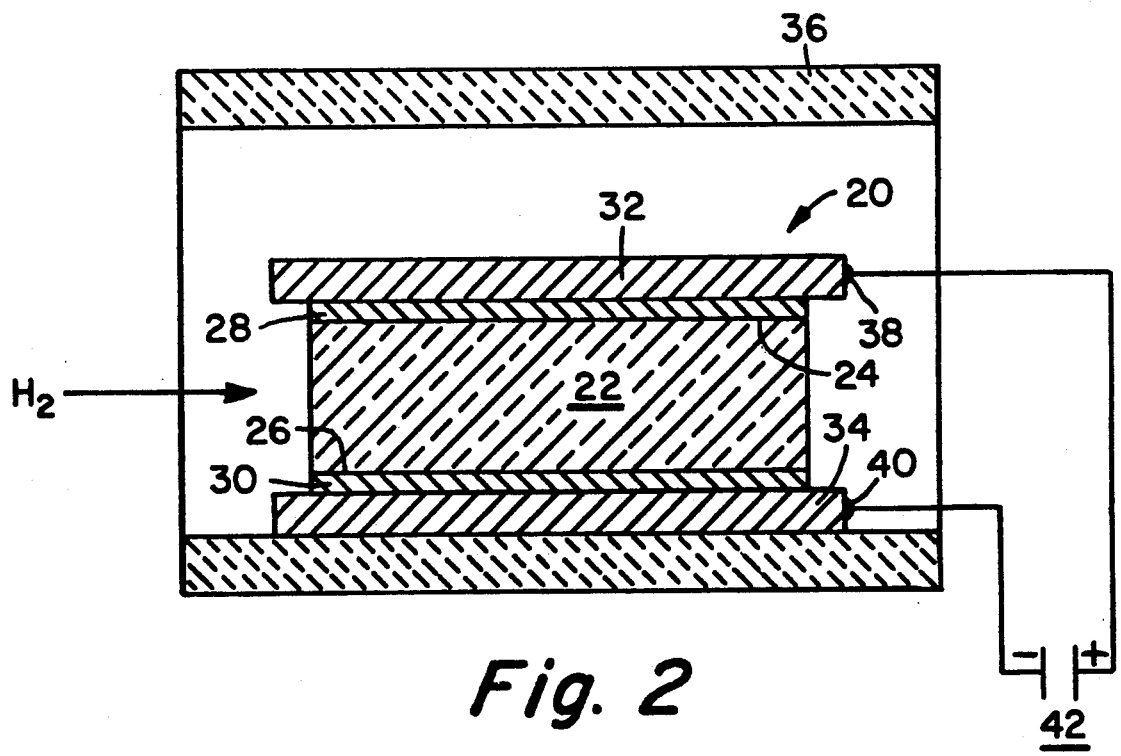
FIG. 2 is a view in cross-section of an assembly for use in practicing the present invention.

FIG. 2 is a view in cross-section of an assembly 20 that may be used in practicing the invention. The assembly of FIG. 2 is employed with a glass article 22 having flat upper and lower surfaces 24 and 26. A flat strip of palladium 28 is placed on upper surface 24 of glass article 22. In turn, glass article 22 is placed on a flat strip of tungsten oxide ($WO_3$) 30 so that lower surface 26 is in intimate contact with $WO_3$ strip 30. In turn, a brass supplemental electrode 32, which may be gold plated, is placed on electrode 28 to provide added weight. This insures good contact with glass surface 24. In like manner, a brass electrode 34, also optionally gold plated, is provided under $WO_3$ electrode 30. It will be appreciated that, while brass supplemental electrode members were found convenient to use, other metals might be substituted.

The assembly of glass and electrodes is then placed in a furnace 36 after electrical connections 38 and 40 are made to the brass electrodes. Wires from connections 38 and 40 extend out from furnace 36, and are connected to a source of electrical current 42.

Furnace 36 may be either a closed furnace or an open furnace. In the former case, a hydrogen-containing atmosphere is maintained at a positive pressure. In the case of an open furnace, a flow of hydrogen gas is maintained, the flow being indicated by arrows in FIG. 2.

We have found that the rate of alkali metal ion removal increases exponentially with temperature, the exponent being the expression $-E/kT$. Accordingly, we employ temperatures ranging from about 400° C. to about 1200° C.

The length of time required for alkali replacement at any given voltage depends on the conductivity of the glass, and on the thickness, or depth, of the layer to be exchanged. The conductivity of fused silica is quite low, except at high temperatures. Therefore, alkali replacement in a piece of fused silica on the order of one centimeter in thickness requires a temperature on the order of 1200° C. in order to accomplish purification in a practical time of about one hour with a practical voltage of 1000 V/cm. Fortunately, such high temperatures are not deleterious to fused silica.

The level of alkali impurity in available fused silica was sufficiently close to the limit of detection by analytical means that comparative data was difficult to obtain. Accordingly, a test was conducted on a $BaO-Al_2O_3-SiO_2$ glass having a sodium impurity level of about 0.1%. The glass was subjected to an electric field of 1000 volts/cm at a temperature of 550° C. for 72 hours.

At this point, the test sample was removed, and the glass analyzed for $Na_2O$ content at intervals of three micron steps from the glass surface. Individual readings, which varied within the limits of error of the test, were plotted and a normalized curve drawn. That curve is shown in FIG. 3 of the drawings.

Figure 3:
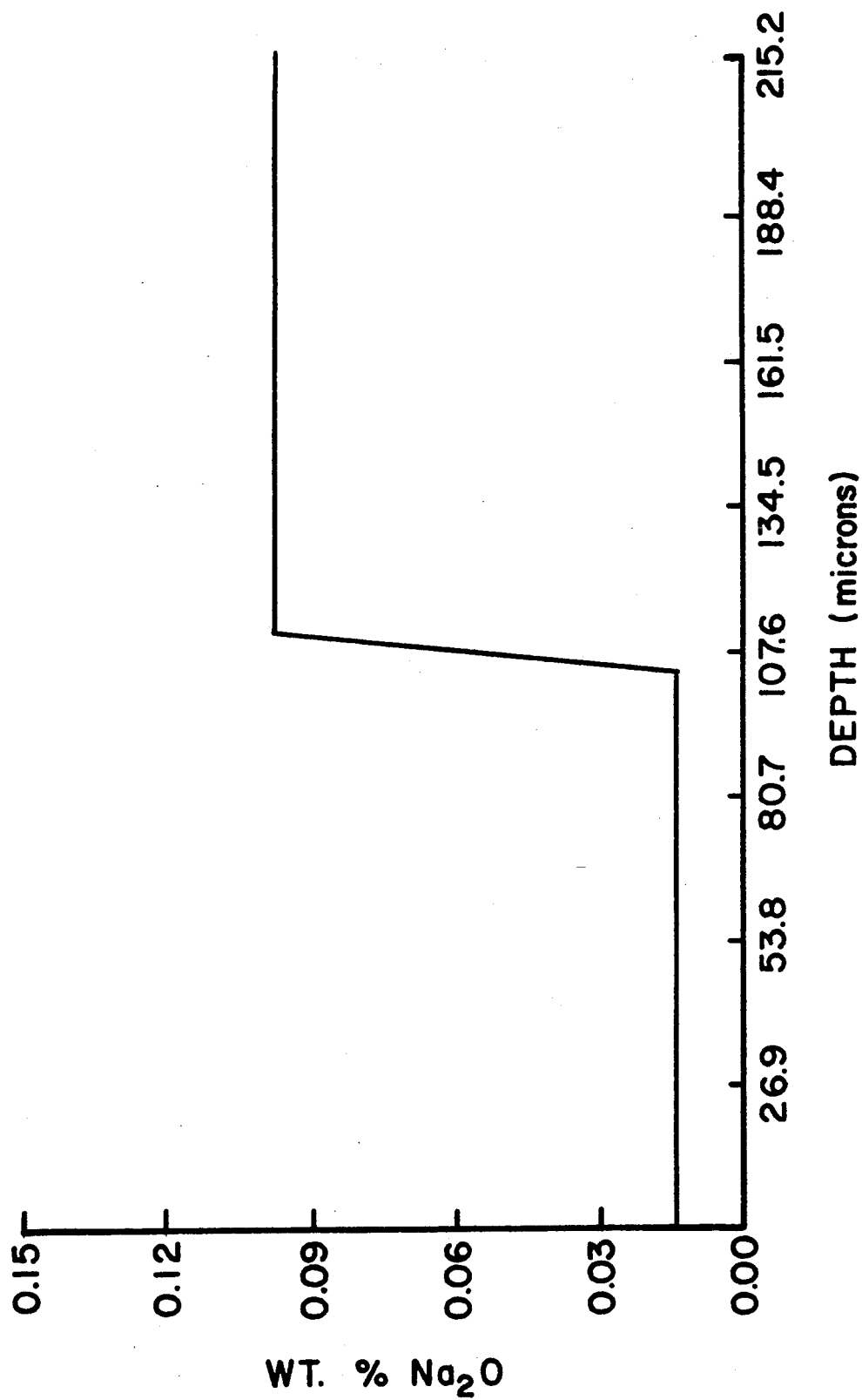
FIG. 3 is a graphical representation showing variation in $Na_2O$ content through a glass body treated in accordance with the invention.

In FIG. 3, $Na_2O$ content, in weight percent, is plotted on the vertical axis, and depth of measurement, in microns, on the horizontal axis. The left hand branch of the curve is at a value of about 0.01% $Na_2O$ which is near the detection limit. At a depth of about 100 microns, the $Na_2O$ content rises sharply to a value of about 0.1%. This content is then maintained through the remainder of the sample, as shown in the right hand branch of the curve. This relatively sharp cutoff makes the replacement method of particular value in producing such items as planar waveguides where a sharp boundary is required.

It will be appreciated that, since glass conductivities vary, temperature dependence of alkali replacement must be determined for each different glass. For example, using the above data and the relative glass conductivities, we have calculated the approximate alkali replacement rates per hour for fused silica with an applied electric field of 1000 volts/cm at three different temperatures. The rates are shown in TABLE I.

TABLE I

| Temp. (°C.) | Rate/hour |
| --- | --- |
| 450 | ~1 micron |
| 1000 | ~2 mm |
| 1276 | ~1 cm |

The techniques just described may also be employed to remove large amounts of alkali metal ion from a glass article. Thus, such large amounts might be employed to assist in glass melting and/or to impart certain desired properties. In this aspect of the invention, it is, of course, necessary to provide a cathode of sufficient mass to accommodate all of the alkali metal ion to be extracted.

One reason for making such an extraction would be to produce a low density glass. Thus, if one makes the very plausible assumption that the silicon-oxygen-silicon bond angles in a silicate glass will not change due to the alkali metal extraction, one can predict the density of a dealkalized glass.

For example, one might remove by electrolysis all of the alkali metal cesium from a binary silicate glass initially containing 20 mole percent cesium oxide. In a completely dealkalized form, this glass would have a density of 1.49 gm/cc. This is 32% less dense than fused silica which has a density of 2.2 gm/cc.

An unusual set of properties might also be obtained by dealkalizing a binary silicate containing 20 mole percent potassium. The refractive index of the dealkalized glass would be expected to remain unchanged at 1.49. The density, however, would be predicted to be 1.7 gm/cc. By comparison, fused silica has a refractive index of 1.46 and a density of 2.2 gm/cc.

An even more unusual set of optical properties might be expected by dealkalizing a binary silicate containing 30 mole percent lithium oxide. The dealkalized glass would be expected to have a refractive index of 1.524 and a density of 2.1 gm/cc. A standard white crown, ophthalmic glass has a refractive index of 1.523 and a density of about 2.9 gm/cc.

One particular application for the present method is in the production of spatial patterns of refractive index changes. Glass bodies exhibiting such patterns are employed in the fields of optical waveguides and related passive devices. The feasibility of producing such patterns, and devices embodying the patterns, are based on the fact that the refractive index of an alkali silicate glass is dependent on three factors. These are the molar volume of the glass, the polarizability of oxygen atoms and the polarizability of the alkali. The polarizability of a small alkali ion (or protons) is insignificant.

The polarizability of a large alkali metal ion, such as cesium, is substantially different, however. Here, polarizability is quite large, and contributes significantly to the refractive index. Therefore, removal of large ions, such as cesium, from a glass can effect a substantial reduction in the refractive index of a glass. For example, in the earlier example of a silicate glass containing 20 mole percent cesium oxide, the glass has a refractive index of 1.530. Removal of all the cesium, and replacement by hydrogen ions, diminishes the index value to 1.375. The smaller changes required for waveguide and device purposes can then be easily achieved by controlled removal of cesium.

The patterning of refractive index in glasses to produce planar waveguides requires an alkali replacement that need only occur to a depth on the order of 10 microns in selected areas. Therefore, the replacement can be accomplished at much lower temperatures within a reasonable time. The exact temperature chosen will depend on conductivity of the glass involved, but typically is about 500° C.

Patterning of the refractive index in a glass body may be achieved by depositing the electrode on the glass surface in the pattern desired for the low refractive index zones. Thus, a tungsten film may be deposited to serve as an electrode only over that portion of a glass surface from which it is desired to extract alkali metal ions.

Three dimensional patterning may also be achieved by use of a composite structure. The structure may comprise a body of alkali-free glass, or other source of low refractive index glass, combined with a thin layer of glass treated in accordance with the present inventive method.

Figure 4:
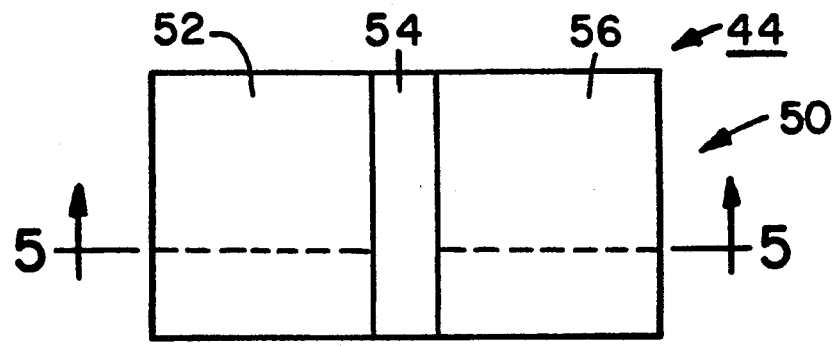
FIG. 4 is a top plan view of a planar waveguide produced in accordance with the invention.
Figure 5:
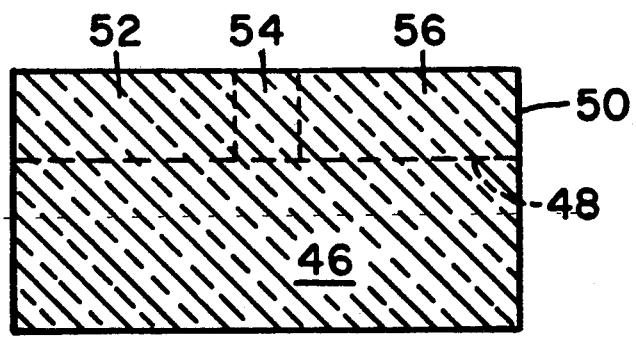
FIG. 5 is a cross-section view taken along line 5—5 in FIG. 4.

FIG. 4 is a top plan view of a planar optical waveguide 44, and FIG. 5 is a cross-section view taken along line 5—5 in FIG. 4. They exemplify a composite structure constructed in the manner just described.

In FIGS. 4 and 5, waveguide 44 comprises a substrate 46 composed of a glass that is nominally free of alkali metal ions. Sealed to the upper surface 48 of substrate 46 is an integral glass body 50. This body has been selectively treated to provide three distinct zones 52, 54 and 56. Glass body 50 is, for example, a cesium silicate glass body in which cesium ions have been removed in zones 52 and 56 and replaced by hydrogen. Zone 54 has remained untreated, and consequently has a higher refractive index than zones 52 and 56.

A planar waveguide, such as waveguide 44, is designed to transmit an optical signal only over a short distance of, at most, several centimeters. Hence, the optical attenuation rate (db/cm) is not as critical as it is for telecommunication fiber optics. Planar waveguide 44 can be used for multimode or single mode transmission. Large dimensions for the high refractive index zone 54 would result in a planar multimode optical waveguide, whereas smaller dimensions would allow transmission of only one mode.

Figure 6:
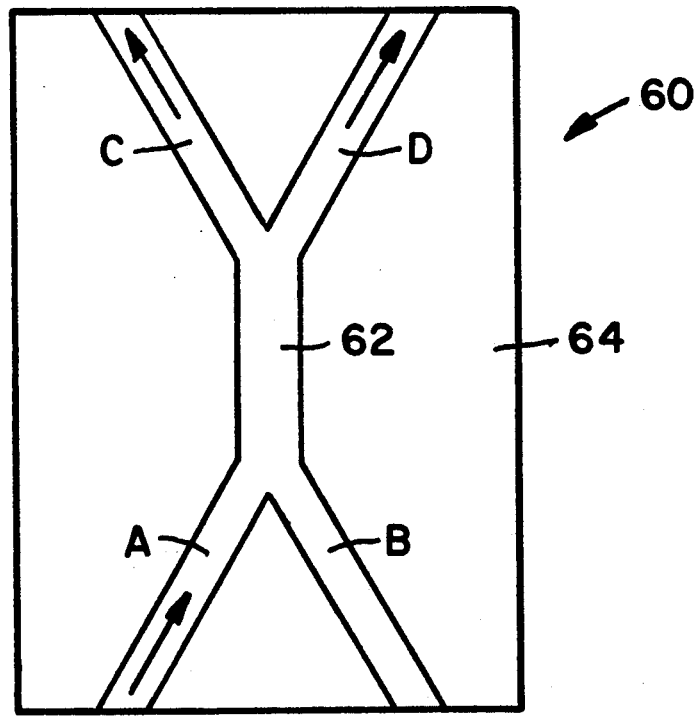
FIG. 6 is a top plan view of a waveguide coupler produced in accordance with the invention.

The present electrolysis method may also be employed to fabricate an N×M directional coupler wherein N and M are branched members providing potential light conducting paths. FIG. 6 is a top plan view of such a planar passive device 60 where N=M=2, and wherein light travels in the high index, high alkali, branched region 62 that is surrounded by dealkalized, low index region 64. As indicated by arrows, light input into part A is divided between two rows, emerging paths C and D and exits along these paths. The ratio of light emerging from paths C and D is defined by the geometry of the coupler. This, in turn, is defined by the patterned electrode geometry used in producing the coupler by selective electrolysis.

Couplers of this nature have been produced by a surface ion exchange reaction. However, the present electrolysis method of production permits greater precision in the optical waveguide geometry. It also permits greater versatility in materials employed, and in the degree of index change that can be obtained.

The high index region, indicated as region 54 in FIG. 5, may be produced by ordinary ion exchange techniques, as well as by the technique described herein. It should be appreciated that, if a waveguide, produced by either technique, is subjected, for a limited time, to the dealkalizing treatment which is the subject of this invention, the high index, high alkali region, indicated as region 54 in FIG. 5, may be driven some distance from the surface into the bulk of the glass. The new surface then will be a low index region. Thus, the high index, light path will be effectively buried in the glass, rather than residing on the surface where it is exposed.

The present method also provides the possibility of varying the refractive index along the longitudinal axis of the waveguide.

We claim:

1. A method of removing alkali metal ions from a glass body that contains at least one alkali metal ion, the method comprising the steps of bringing a hydrogen-ion-producing anode into intimate contact with a portion of the glass body surface, bringing an oxide receptor of the alkali metal ion to be removed into intimate contact with another portion of the glass body surface as a cathode, and exposing the assembly of glass body and electrodes to a hydrogen-containing atmosphere while the assembly is at an elevated temperature and has a direct current applied across the electrodes.

2. A method in accordance with claim 1 wherein the anode is composed of a metal selected from the group consisting of palladium and titanium.

3. A method in accordance with claim 2 wherein the selected metal is palladium.

4. A method in accordance with claim 1 wherein the cathode is composed of an oxide of a metal selected from the group consisting of nickel, cobalt, iron, vanadium, titanium, molybdenum, niobium, zirconium, tungsten, tantalum and hafnium.

5. A method in accordance with claim 4 wherein the selected metal is zirconium, niobium, tungsten, or molybdenum.

6. A method in accordance with claim 5 wherein the selected metal is tungsten.

7. A method in accordance with claim 1 wherein at least one of the electrodes and the glass body have smooth flat surfaces which are tightly pressed together.

8. A method in accordance with claim 1 wherein at least one electrode is applied to the glass body as a film.

9. A method in accordance with claim 8 wherein the film is applied by thermal evaporation.

10. A method in accordance with claim 1 wherein the assembly of the glass body and electrodes is heated in a closed furnace with a hydrogen-containing atmosphere at a positive pressure.

11. A method in accordance with claim 1 wherein the assembly of the glass body and electrodes is exposed to a stream of hydrogen-containing gas flowing over it while being heated at an elevated temperature.

12. A method in accordance with claim 1 wherein the assembly of the glass body and electrodes is heated at a temperature in the range of 400°–1200° C.

13. A method in accordance with claim 12 wherein the glass is fused silica and the temperature is on the order of 1000°–1200° C.

14. A method in accordance with claim 1 wherein the glass body is fused silica, or a silicate glass, containing at least one alkali metal as an impurity.

15. A method in accordance with claim 1 wherein the glass body is a glass containing at least one alkali metal intentionally incorporated in the glass composition.

16. A method in accordance with claim 15 wherein the anode and cathode are applied selectively to portions of the glass surface whereby the alkali metal ions are selectively removed from zones of the glass body intermediate the anode and cathode.

17. A method in accordance with claim 16 wherein the alkali metal ion is a large ion, and its removal substantially alters the density and the refractive index of the glass.

18. A method in accordance with claim 17 wherein the large alkali metal ion is cesium.

19. A method in accordance with claim 16 wherein anodes and cathodes are applied to two spaced portions of a glass body separated by a central zone whereby the large alkali metal ions are selectively removed from the spaced portions, thereby producing a planar waveguide.

20. A method in accordance with claim 19 wherein the central zone is a high refractive index, alkali metal ion-containing zone sandwiched between side zones of lower refractive index that are alkali metal ion depleted.

21. A method in accordance with claim 19 wherein the central zone is a branched zone that forms a directional coupler.

22. A method in accordance with claim 15 wherein the alkali metal is concentrated in a surface region of the glass body to form an alkali-rich zone, the anode and cathode are applied to portions of the glass surface for a limited time to drive the alkali-rich zone some distance into the glass to create a buried, alkali-rich zone.

* * * * *